United States Patent [19]

Boone et al.

[11] 3,875,075

[45] Apr. 1, 1975

[54] CATALYST FOR THE POLYMERIZATION OF ETHYLENE AND TERMINAL OLEFINS

[75] Inventors: David E. Boone, Downers Grove; Peter Fotis, Highland, both of Ind.

[73] Assignee: Standard Oil Company, Chicago, Ill.

[22] Filed: Apr. 16, 1973

[21] Appl. No.: 351,465

[52] U.S. Cl. .... 252/429 C, 252/431 C, 260/88.2 R, 260/94.9 E
[51] Int. Cl. ............................................. B01j 11/84
[58] Field of Search .................... 252/429 C, 431 C

[56] References Cited
UNITED STATES PATENTS

| | | | |
|---|---|---|---|
| 3,400,110 | 9/1968 | Dassesse et al. | 252/429 C X |
| 3,454,547 | 7/1969 | Dellbouille et al. | 252/429 C X |
| 3,759,884 | 9/1973 | Tokuzumi et al. | 252/429 C X |

FOREIGN PATENTS OR APPLICATIONS 1,258,984   1/1972   United Kingdom ........... 252/429 C

*Primary Examiner*—Patrick P. Garvin
*Attorney, Agent, or Firm*—Reed F. Riley; Arthur G. Gilkes; William T. McClain

[57] ABSTRACT

A novel supported catalyst and process for polymerization of ehtylene, terminal olefins or their mixtures which gives unusually high polymer yields that comprises contacting said olefin or said mixture with (a) the reaction product of a Group IVB or VB transition metal compound with either (1) a chlorine-substituted carboxylic acid salt of magnesium or (2) its reaction product with an aluminum halide and (b) an organoaluminum compound promoter.

7 Claims, No Drawings

CATALYST FOR THE POLYMERIZATION OF ETHYLENE AND TERMINAL OLEFINS

SUMMARY OF THE INVENTION

This invention relates to a novel supported catalyst and a process for the use thereof for the polymerization of ethylene, terminal olefins or their mixtures. More specifically, the invention relates to a novel supported catalyst and process for the use thereof for the polymerization of ethylene, alpha-olefins or their mixtures which may be used for slurry, solution or vapor phase polymerization and in which exceptionally large yields of polymer are obtained which can obviate the necessity of separating the catalyst from the polymeric products as formed.

In accordance with the instant invention, ethylene, an alpha-olefin or their mixtures are polymerized to normally solid polymers at low to medium pressures and moderate temperatures by contacting the olefin or mixture of olefins with a supported catalyst system comprising (a) the reaction product of a Periodic Group IVB or Periodic Group VB transition metal halide or haloester with either (1) a magnesium salt of a chlorine-substituted carboxylic acid or (2) the latter's reaction product with an aluminum halide and (b) an organoaluminum compound promoter. Polyethylene produced using the instant catalyst can be formed in yields of over 50,000 grams of polymer per gram of catalyst in an hour at about 500 p.s.i.g. and the catalyst is sufficiently versatile to be used in slurry, solution or vapor phase polymerization processes. When used with techniques to vary molecular weight distribution, a wide range of polymer products can be produced which are useful for a number of different applications for which polyethylenes and copolymers thereof have shown their suitability.

BACKGROUND OF THE INVENTION

A number of support materials have been suggested for improving ethylene polymerization catalysts made from transition metal compounds promoted by aluminum alkyl compound catalysts. Foremost among these are supports containing magnesium. Recently, in British Patent No. 1,258,984 and Canadian Patent No. 851,265 magnesium carboxylate compounds have been disclosed as support materials. In particular, the above British Patent discloses yields of 4 to 20 kilograms of polyethylene per gram of support at 3 to 8 atmospheres total pressure.

Now it has been found that superior yields of polyethylene can be obtained at moderate temperatures and pressures by using the reaction product of a transition metal compound and the magnesium salt of a chlorine-substituted carboxylic acid or the reaction product of a transition metal compound with a material formed by the reaction of an aluminum halide with the magnesium salt of a chlorine-substituted carboxylic acid.

STATEMENT OF THE INVENTION

The starting material of the catalyst of the instant invention is usefully the magnesium salt of a chlorine-substituted carboxylic acid containing two to about seven carbon atoms. More preferably, it is the magnesium salt of the above class of substituted carboxylic acids which contain one to about three carbon atoms and most preferably, it is magnesium trichloroacetate.

Optionally, the starting material of the catalyst of the instant invention can be made by taking such a substituted carboxylic acid salt as described above and reacting it with aluminum bromide, chloride or fluoride or, more preferably, aluminum chloride. If the substituted carboxylic acid salt (first component) is further reacted with aluminum compound (second component) following this variation the relative amounts of the first and second components of the support material which are reacted together can usefully vary from about 50 mols of the first component and about 1.0 mol of the second component to about 1.0 mol of the first component and about 5.0 mols of the second component. More preferably, the first and second components are reacted in amounts of about 10 mols of the first component and about 1.0 mol of the second component to about 1.0 mol of the first component and about 3.0 mols of the second component. Most preferably, the ratio of the first and second components reacted varies from about 4 mols of the first component and about 1.0 mol of the second component to about 1.0 mol of the first component and about 2.0 mols of the second component.

Usefully, the first and second components above are reacted in the appropriate mol ratio at a temperature between about 25°C. and about 200°C. More preferably, the reaction temperature is chosen between about 60°C. and about 150°C. and, most preferably, a reaction temperature between about 60°C. and about 120°C. is used.

Normally, reaction between the first and second components of the support material is carried out by heating the materials together in a substantially non-reactive medium such as a liquid hydrocarbon. The medium used is preferably purified of moisture and impurities and the reaction preferably carried out in an inert atmosphere.

The starting material, if the variant of using the reaction product of a substituted carboxylate salt and aluminum compound is used, is washed free of unreacted aluminum halide with solvent at ambient to elevated temperatures prior to combination with the Group IVB or VB compound. Generally, additional amounts of the reaction medium are chosen for this purpose. The washing is employed, usefully at a temperature of about 25°C. to about 150°C. More preferably, a washing temperature of about 60°C. to about 130°C. is used.

In this variant the reaction to form the starting material is usefully carried out from about 30 minutes to about 48 hours, more preferably, about 1 hour to about 36 hours, and most preferably, about 3 hours to about 24 hours, and produces the reaction product in a finely divided powder form which can be used directly to combine with the Group IVB or VB compound to be employed.

The starting material, as in either variant above, is reacted with a Group IVB or VB halide or haloester to form a Group IVB or Group VB compound catalyst composition which is the supported catalyst. This reaction is effected by adding the Group IVB or Group VB compound neat or in a reaction medium to the starting material. More preferably, the Group IVB or VB halide or haloester is reacted with the support material by combining it at least partially dissolved in a reaction medium.

Usefully, any substantially inert liquid such as a hydrocarbon in which the supported catalyst is substantially insoluble may be employed. It is convenient, if the variant of using the reaction product of the substituted carboxylate salt and aluminum compound is used, to employ the same medium as was used in that reaction.

It is important, for best results that the reaction medium be free of traces of moisture, oxygen, carbon dioxide and polar organic compounds, so prior to use, it should be percolated through silica gel or molecular sieves for best results.

The temperature of the reaction between the transition metal compound and the starting material is usefully from about 25°C. to about 200°C. More preferably, the temperature range used is about 40°C. to about 150°C. and, most preferably, a reaction temperature from about 60°C. to about 120°C. is used. The reaction time usefully may vary between about one and about 36 hours, more preferably, about two and about 24 hours and, most preferably, about 4 and about 24 hours.

Usefully, any chloride or bromide or bromo- or chloroester of titanium (IV) or vanadium (V) may be used. More preferably, titanium (IV) or vanadium (V) chloro- or bromoalkoxides with three halogen atoms per metal atom, or their tetrachlorides or tetrabromides can be used. Most preferably, the compound used is titanium tetrachloride or a titanium chloroalkoxide of formula Ti(OR)Cl$_3$. In all the above the alkoxide moiety contains a lower alkyl group of from one to about six carbon atoms.

In general, the amount of the Group IVB or Group VB compound used for reaction with the starting material is not important as long as a substantial excess is used. A weight ratio of more than about 5 to about 10 is useful. By weight ratio is meant the weight of Group IVB or Group VB compound used divided by the weight of Group IVB or Group VB compound calculated as the metal to be on the supported catalyst after the combination. Preferably, more than about a 20 fold weight ratio is used, and most preferably, more than about 40 fold weight ratio is used.

Any loosely adhering Group IVB or Group VB compound is preferably removed from the supported catalyst by washing with a solvent which dissolves the Group IVB or Group VB compound. For example, such materials as xylene, toluene, chlorobenzene, benzene, hexane, heptane have been used successfully to wash the catalyst.

The chemical form of the Group IVB or Group VB compound in the supported catalyst is unknown, but, since it appears impossible to remove it completely with solvent, it is probably chemically linked to the substrate. Since the chemical form of the Group IVB or Group VB compound on the surface of the substrate is unknown it may or may not exhibit, depending upon the Group IVB or Group VB substance used, halide and/or alkoxy linkages.

The amount of Group IVB or Group VB compound combined with the starting material after reaction is relatively small being in the range of about 0.1 to about 10 percent of the supported catalyst calculated as the Group IVB or Group VB metal. More preferably, it is about 0.5 to about 5 weight percent. Other things being equal, the more Group IVB or VB compound combined with the starting material, the more active in terms of yield the supported catalyst appears to become.

Use of the above catalyst for the polymerization of olefins is accompanied by the use of a promoter which is an organoaluminum compound such as trialkyl, a dialkyl halide or dialkyl hydride or a combination thereof. More preferably, a trialkylaluminum or dialkylaluminum hydride is used. Most preferably, a trialkylaluminum is the promoter which is used. By alkyl here is meant a hydrocarbon radical containing one to about six carbon atoms. For best results with average grade solvents, part of the total promoter added is used to pretreat the solvent. The remaining promoter is then added as a concentrated mixture together with the catalyst.

It has been found to be preferable to pretreat the catalyst with at least one-quarter, more preferably, at least one-half and, most preferably, at least three-quarters of the total amount of promoter used by bringing them together for a short period of time, e.g., several minutes, in a concentrated form, e.g., a syringe, just prior to use in polymerization. It is unknown why this concentrated contacting of the supported catalyst and the organoaluminum compound promoter substantially increases the yield.

For useful results, the ratio of total millimols of promoter used to grams of supported catalyst should be at least about 2:1. More preferably, it is at least about 10:1 and, most preferably, it is at least about 25:1. This ratio depends upon polymerization temperature and the type of polymerization somewhat, for example, increasing as polymerization temperature decreases, and the ratio also depends upon solvent purity and the amount of solvent used.

The promoted catalyst described above may be used in particle form or solution polymerizations in the temperature range from about 0°C. to over 270°C. These promoted catalysts may be used also in a solventless process wherein the olefin is the liquid phase or wherein the olefin is polymerized directly from the vapor phase. The polymerization temperature using a solventless process should be large enough to give an adequate polymerization rate but not too large to raise the pressure above that which is normally used in this type of process, i.e., up to about several hundred p.s.i.g.

In the particle form or slurry process, the polymerization is carried out at a temperature such that the polymer as formed is a solid in the polymerization reactor. The preferred polymerization temperature is about 40°C. to about 108°C. In solution polymerizations the temperature preferably varies from about 120°C. to about 270°C. In the vapor process wherein little or no liquid medium is used, the useful temperature range is from about 40°C. to about 130°C., preferably, about 70°C. to about 120°C.

Whereas the preferred olefin to be polymerized is ethylene, it is found that the starting material when reacted with a Group IVB or Group VB compound and used with a promoter is useful for the polymerization of alpha-olefins such as propylene, butene, pentene, dienes such as butadiene, and mixtures (up to about 10 mol percent of alpha-olefins) thereof, e.g., ethylene and up to about 10 mol percent of 1-butene.

It is of particular importance for best results that the olefin, for example ethylene, be substantially free of catalyst poisons. Thus, it is preferred to use polymerization grade olefin and to pass it through a molecular sieve prior to use to remove the remaining traces of moisture, oxygen, carbon dioxide and polar organic compounds.

The organic liquid employed as the polymerization medium in the solution process or particle form process can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene or xylene or a halogenated aromatic compound such as chlorobenzene, chloronaphthalene or ortho-dichlorobenzene. The nature of the medium is subject to considerable variation, although the medium employed should be liquid under the conditions of reaction and relatively inert. Hydrocarbon liquids, preferably, hexane are desirably employed. Other media which can be used include ethylbenzene, isopropylbenzene, ethyltoluene, n-propylbenzene, diethylbenzenes, mono- and dialkylnaphthalenes, n-pentane, n-octane, isooctane, methylcyclohexane, Tetralin and Decalin.

The media employed in practicing this invention should be purified, for best results, from traces of moisture, oxygen, carbon dioxide and polar organic compounds prior to use in the polymerization process by contacting the medium, for example, in a distillation procedure or otherwise, with an organoaluminum compound, for example, triethylaluminum, prior to or after percolating the solvent through silica gel or molecular sieves.

The polymerization time is not critical and will usually be of the order of 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by return of the polymerization medium, if used, and excess monomer to the charging zone wherein the catalyst can be replenished and additional monomer introduced.

The novel catalyst of this invention when employed for the polymerization of olefins is used normally with an additive to control molecular weight such as hydrogen. Solid polymers having molecular weights greater than about 50,000 and less than about 3,000,000 result thereby. The amount of hydrogen to be used depends upon the molecular weight distribution to be obtained and is well known to those skilled in the art.

The polyolefins prepared in accordance with this invention can be extruded, mechanically melted, cast or molded as desired. They can be used to form plates, sheets, films or a variety of molded objects.

Usefully, the pressure range for the polymerization process is about atmospheric to over 1000 p.s.i.g. More preferably, the polymerization pressure varies upwards from about 100 p.s.i.g. and, most preferably, the polymerization range as applied here is about 200 p.s.i.g. or larger. The polymerization yield depends upon the olefin pressure and substantial increases in yields have been noticed by raising the pressure from about 100 p.s.i.g. to about 300 or 400 p.s.i.g.

While the invention is described in connection with the specific examples below, it is to be understood that these are for illustrative purposes only. Many alternatives, modifications and variations will be apparent to those skilled in the art in the light of the below examples and such alternatives, modifications and variations fall within the scope and spirit of the appended claims.

EXAMPLE I

A 7.1 gram portion of magnesium trichloroacetate (0.0204 mols) and 5.1 grams of aluminum chloride (0.0382 mols) were mixed under argon and the mixture placed in a three-necked flask equipped with a thermometer where it was heated at about 100°C. for 21 hours. It was then cooled and ball milled for 23 hours until a fine powder was formed.

The magnesium trichloroacetate was prepared by adding excess basic magnesium carbonate to trichloroacetic acid in distilled water. The mixture was then filtered and the filtrate dried at 80°C. under vacuum.

About 2 grams of the powder from the first paragraph above was combined under nitrogen in a two-necked flask equipped with a thermometer and a and a condenser with 2 milliliters of titanium tetrachloride and 100 milliliters of dried xylene and heated with slurrying at about 100°C. for about 17 hours. The solid was then washed with hexane.

EXAMPLE II

A 5.0 gram portion of magnesium trichloroacetate (0.014 mols) along with 3.6 grams of aluminum chloride (0.027 mols) was added to a 50 milliliter portion of benzene under argon in a 200 milliliter, two-necked flask equipped with a condenser and a thermometer. The mixture was magnetically stirred and heated at slow reflux for 19 hours. At this point, 2.6 grams of titanium tetrachloride (0.0137 mols) was added and the heating and stirring continued an additional 5 hours. The solid was then separated and washed with hexane.

EXAMPLE III

A 1000 milliliter, stirred, stainless steel reactor was dried at 118°C. under a slow nitrogen flow and then evacuated to a pressure of 0.02 millimeters. The vacuum was broken by pressuring 670 milliliters of purified hexane containing 22 milligrams triethylaluminum into the reactor with 160 p.s.i.g. of ethylene. When the hexane-ethylene solution temperature had stabilized at 82°C., hydrogen was introduced and allowed to equilibrate at a total pressure of 310 p.s.i.g. The system was then pressured to 600 p.s.i.g. with ethylene.

One milliliter of the catalyst from Example I (2.5 milligrams of catalyst) was mixed with 2.0 milliliters of a hexane solution of triethylaluminum (0.38 millimols of TEAL). This was placed in a catalyst addition assembly and washed into the reactor with 17 milliliters of hexane pressured with 700 p.s.i.g. of ethylene. The reactor pressure was maintained at 700 p.s.i.g. with ethylene fed on demand. The polymerization temperature was kept at about 82°C. for the one hour reaction time. A 43.8 gram portion of polymer was recovered for a yield of 17,500 grams of polymer per gram of catalyst. The following physical data were obtained for the polymer: melt index = 0.5 grams/10 minutes; unannealed density = 0.956; annealed density = 0.967; $\overline{M}w/\overline{M}n$ = 6.5 by gel permeation chromatography (G.P.C.).

EXAMPLE IV

The same equipment, reagents and polymerization conditions were in this Example as were used as Example III except:

a. 3.9 milligrams of the catalyst of Example I was used; and b. 0.29 millimols of triethylaluminum were mixed with the catalyst; and c. 300 p.s.i.g. of hydrogen was used. A 50.3 gram portion of polymer was recovered for a yield of 12,900 grams of polymer per gram of catalyst. The following physical data were obtained on the polymer: melt index = 5.1 grams/10 minutes; unannealed density = 0.962; annealed density = 0.977; $\overline{Mw}/\overline{Mn}$ = 6.9 by G.P.C.

EXAMPLE V

A 500 milliliter stirred, stainless steel reactor was dried at 121°C. under a slow nitrogen flow and then evacuated to 0.12 millimeters pressure. The vacuum was broken by pressuring 244 milliliters of purified hexane containing 44 milligrams (0.39 millimols) of triethylaluminum into the reactor with 450 p.s.i.g. of ethylene. The reactor was then vented to 250 p.s.i.g. When the hexane-ethylene solution temperature had stabilized at 82°C., hydrogen was introduced and allowed to equilibrate at a total pressure of 155 p.s.i.g. The system was then pressured to 600 p.s.i.g. with ethylene.

One milliliter of the catalyst from Example II (0.9 grams of catalyst) was mixed with 1.0 milliliters of a hexane solution of triethylaluminum (0.19 millimols of TEAL). This was placed in a catalyst addition assembly and washed into the reactor with 17 milliliters of hexane pressured with 700 p.s.i.g. of ethylene. The reactor pressure was maintained at 700 p.s.i.g. with ethylene fed on demand. The polymerization temperature was kept at about 82°C. for the 1.0 hour reaction time. A 24.0 gram amount of polymer was recovered for a yield of 26,600 grams of polymer per gram of catalyst.

EXAMPLE VI

All runs in this Example were carried out in a stirred, 1-litre autoclave operated batchwise. The reactor was heated externally but had internal cooling which enabled temperature control to within ±1°F. Strictly anhydrous conditions were maintained in all operations. All reagents, solvents, and ethylene were treated to remove catalyst poisons. Solvents were generally percolated through silica gel or molecular sieves, whereas ethylene of polymerization grade quality was first passed through a molecular sieve. Alkyl pretreatment of the solvent is an advantageous purification procedure.

The reactor, at polymerization temperature, was evacuated and a known volume of hydrogen introduced. A 450 milliliter portion of solvent (hexane or isopar) was then fed in from a closed system. If the solvent is to be alkyl treated prior to polymerization, then the necessary amount is added to the reactor at this stage. Purified ethylene from a high pressure feed cylinder was then introduced to a pressure of about 500 p.s.ig. The catalyst and activator, premixed in a small vessel, were then pressured into the reactor with ethylene. Additional ethylene was then quickly pressed in to the desired level for polymerization. Premixing the catalyst and activator is desirable for achieving best activity. Ethylene is fed on demand to maintain the regulated pressure from a weighed ethylene cylinder. Throughout the run stirring was held constant at about 800 rpm.

Polymerization was continued until the polymer solution concentration reached about 20 weight percent. The mixture from the reactor was then dumped into another vessel and the polymer recovered from solution by precipitation.

| Catalyst | Catalyst Amount (milligrams) | Solvent | Polymerization Temperature (°F.) | Hydrogen (p.s.i.g.) | Yield (grams/gram) | Melt Index (grams/10 minutes) |
|---|---|---|---|---|---|---|
| Example I* | 4.5 | hexane | 325 | 50 | 13,000 | 3.6 |
| Example II** | 8.0 | Isopar | 325 | 15 | 9,000 | 0.65 |

*A 24 milligram portion of TEAL added with the catalyst. No pretreatment of solvent with TEAL.
**A 24 milligram portion of TEAL added with the catalyst. A 24 milligram portion of TEAL used in the solvent pretreatment.

EXAMPLE VII

A 1.8 gram portion of magnesium trichloroacetate, dried at 110°C. under high vacuum, and 30 milliliters of dried benzene were combined in a 100 milliliter round-bottom flask. A 1.5 milliliter portion of titanium tetrachloride was added and the mixture was heated at reflux for 23 hours under nitrogen. After cooling, a portion of the resulting slurry was washed with dry hexane.

EXAMPLE VIII

A. An 82 milliliter portion of titanium tetrachloride was added to 550 milliliters of benzene and over a one-hour period 82 milliliters of titanium tetrabutoxide was introduced dropwise. The solution was stirred for 24 hours at room temperature.

B. An 0.72 gram portion of magnesium trichloroacetate was combined with 20 milliliters of the titanium trichlorobutoxide solution from A. This mixture was refluxed for 30 hours with stirring. A 6 milliliter portion of this slurry was added to dried hexane and the solid was washed free of any unsupported titanium compound.

EXAMPLE IX

Catalysts from Examples VII and VIII were used to polymerize ethylene at 180°F. in a 500 milliliter stirred autoclave using 150 p.s.i.g. of hydrogen and 550 p.s.i.g. ethylene. A total of 66 milligrams of triethyl-aluminum and 260 milliliters of hexane were used.

TABLE

| Catalyst | Catalyst Amount (milligrams) | Yield (grams/gram) | Melt Index (grams/10) minutes) |
|---|---|---|---|
| Example VII | 1.6 | 28,600 | 0.6 |
| Example VIII | 0.9 | 75,000 | 0.56 |

EXAMPLE X

A. A 163 gram portion of trichloroacetic acid was combined with 39 grams of basic magnesium carbonate in 600 milliliters of distilled water. The solution was filtered, the filtrate was evaporated, and the resulting solid dried at 70°C. under house vacuum.

B. A portion of the material from A. above was additionally dried at 130°C. at 0.01 torr. overnight.

C. A 41.4 gram portion of A. above was dried at 138°C. under high vacuum overnight.

EXAMPLE XI

A 163 gram portion of trichloroacetic acid was dissolved in 400 milliliters of benzene and 39 grams of basic magnesium carbonate was slowly added. The mixture was heated at benzene reflux and the benzene-water azeotrope was distilled over. During the 29 hour heating time, 12 milliliters of water were azeotroped out of the reaction flask.

EXAMPLE XII

A 183 gram portion of trichloroacetic acid was dissolved in 500 milliliters of benzene and 29.2 grams of magnesium hydroxide was added. The mixture was refluxed for 48 hours with 14 milliliters of water azeotroping out of the reaction flask.

EXAMPLE XIII

A. An 8.6 gram portion of magnesium trichloroacetate from Example X A. above was reacted with 6.1 grams of aluminum chloride in 50 milliliters of benzene at reflux for 27 hours.

B. A 5.0 milliliter portion of the slurry from A. above was reacted in 10 milliliters of benzene with 3.1 grams of titanium (IV) butoxytrichloride and 40 milliliters of benzene. This was heated at reflux for 17 hours. The catalyst was washed with dry hexane before use.

EXAMPLE XIV

A 3.3 gram portion of magnesium trichloroacetate from Example X C. was reacted in 40 milliliters of hexane with 2.0 milliliters of vanadium tetrachloride. The mixture was stirred at room temperature for 18 hours. The product was washed with hexane before use.

EXAMPLE XV

A 3.3 gram portion of magnesium trichloroacetate from Example X C. was reacted in 40 milliliters of benzene with 2.0 milliliters of vanadium tetrachloride. The mixture was stirred for 18 hours at room temperature. The catalyst was washed with hexane before use.

EXAMPLE XVI

An 8.4 gram portion of magnesium acetate, prepared by drying the hydrate under 0.15 millimeter pressure at 140 to 160°C. overnight, was reacted in 50 milliliters of benzene with 19.5 milliliters of titanium tetrachloride. The mixture was heated at reflux for 22 hours. The catalyst was washed with benzene and then hexane before use.

EXAMPLE XVII

A 5.0 milliliter portion of slurry from Example XIII A. in 30 milliliters of benzene was reacted with approximately 3.2 grams of titanium compounds prepared by combining equal molar quantities of titanium tetrafluoride, titanium tetrachloride, titanium tetrabromide, titanium tetraiodide ad titanium tetrabutoxide in benzene. This mixture was heated at reflux for 20 hours. The catalyst was washed with dry hexane before use.

EXAMPLE XVIII

A 5.0 milliliter portion of slurry from Example XIII A. in 50 milliliters of benzene was reacted with 0.15 grams of titanium butoxytrichloride dissolved in 0.5 milliliters of benzene. This mixture was heated at reflux for 20 hours. The catalyst was washed with dry hexane before use.

EXAMPLE XIX

A 7.9 gram portion of magnesium trichloroacetate from Example X B., 30 milliliters of benzene and 4.5 milliliters of titanium tetrachloride were combined and heated at reflux for 23 hours. The catalyst was washed once with benzene and then with hexane before use.

EXAMPLE XX

A 20 milliliter portion of slurry from Example XI was washed with 50 milliliters of benzene and then 40 milliliters of benzene was added along with 5.0 milliliters of titanium tetrachloride. This mixture was heated at reflux for 25 hours. The catalyst was washed with benzene and then hexane before use.

EXAMPLE XXI

A 200 milliliter portion of slurry from Example XI was reacted with 40 milliliters of titanium tetrachloride by heating at reflux for 22 hours. The catalyst was washed with benzene and then hexane before use.

EXAMPLE XXII

All the polymerization experiments of this Example were carried out in a 500 milliliter stirred autoclave using 260 milliliters of dry hexane. The promoter in each case was 66 milligrams of triethylaluminum, 44 milligrams added to the solvent prior to catalyst addition and 22 milligrams premixed and added with the catalyst.

TABLE

| Catalyst | Amount Catalyst (milligrams) | Polymerization Pressure (p.s.i.g) | Polymerization Temperature (°F.) | Yield (grams/gram) | Melt Index (grams/ 10 minutes) |
|---|---|---|---|---|---|
| Ex. XIIIB. | 1.0 | 150/700 | 180 | 57,000 | 0.26 |
| Ex. XVII | 0.9 | 150/700 | 180 | 28,000 | 0.27 |
| Ex. XVIII | 0.7 | 55/350 | 200 | 16,000 | 0.1 |
| Ex. XVIII | 0.7 | 100/350 | 180 | 9,400 | 0.5 |

*Pressure is given as p.s.i.g. hydrogen followed by a slash and then the total pressure in p.s.i.g. which is the sum of the hydrogen, ethylene and volatilized solvent partial pressures.

EXAMPLE XXIII

Polymerization conditions in this Example were the same as in Example XXII.

TABLE

| Catalyst | Amount Catalyst (milligrams) | Polymerization Pressure (p.s.i.g.) | Polymerization Temperature (°F.) | Yield (grams/gram) | Melt Index (grams/ 10 minutes) |
|---|---|---|---|---|---|
| Ex. XIX | 1.0 | 150/700 | 180 | 26,000 | 0.42 |
| Ex. XX | 0.40 | 160/700 | 180 | 45,000 | 0.50 |
| Ex. XXI | 0.65 | 55/350 | 200 | 14,600 | 0.32 |
| Ex. XXI | 0.65 | 55/350 | 160 | 44,000 | 0.02 |
| Ex. XIV | 2.4 | 150/500 | 180 | 820 | — |
| Ex. XV | 3.2 | 19/500 | 180 | 4,300 | 0.3 |

* Pressure is given as p.s.i.g. hydrogen followed by a slash and then the total pressure in p.s.i.g. which is the sum of the hydrogen, ethylene and volatilized solvent partial pressures.

EXAMPLE XXIV

Polymerization conditions in this Example were the same as in Example XXII.

| Catalyst | Amount Catalyst (milligrams) | Polymerization Pressure (p.s.i.g.) | Polymerization Temperature (°F.) | Yield (grams/gram) | Melt Index (grams/ 10 minutes) |
|---|---|---|---|---|---|
| Ex. XXI | 0.65 | 55/350 | 160 | 44,000 | 0.02 |
| Ex. XVI | 1.5 | 65/350 | 160 | 5,000 | 0.0 |

This Example is a comparative example showing the improvement in yield and melt index when a catalyst formed by reaction of magnesium trichloroacetate with titanium tetrachloride (catalyst of Example XXI) rather than a catalyst formed by reaction of magnesium acetate with titanium tetrachloride (catalyst of Example XVI) is used.

EXAMPLE XXV

In this Example ethylene was polymerized from the gas phase in a continuous process (about 1 pound per hour) rather than in a batch process. The catalyst was the reaction product of magnesium trichloroacetate and titanium tetrachloride promoted by triethylaluminum. The magnesium trichloroacetate starting material was prepared from basic magnesium carbonate and trichloroacetic acid in refluxing benzene.

RUN A

| Polymerization Conditions | | | | |
|---|---|---|---|---|
| Temperature (°F.) | 212 | 213 | 215 | 208 |
| Pressure (p.s.i.g.) | 300 | 300 | 300 | 300 |
| Reactor gas composition (mol percent) | | | | |
| Hydrogen | 38 | 38–46 | 40 | 43 |
| Ethylene | 59 | 49–57 | 53 | 49 |
| Ethane | 0.1–1.5 | 2.9–4.0 | 3.1–4.7 | 5.0 |
| Isopentane | 2 | 2 | 3 | 3 |
| Catalyst | | | | |
| Feeder concentration (milligrams/milliliters) | 125 | 125 | 125 | 125 |
| Feed rate (milligrams/hour) | 32 | 33 | 45 | 49 |
| Promoter | | | | |
| $AlEt_3$, feeder concentration (milligrams/liter) | 1,250 | 1,250 | 1,250 | 1,250 |
| $AlEt_3$, feed rate (milligrams/hour) | 320 | 330 | 450 | 490 |
| Weight ratio ($AlEt_3$/catalyst) | 10 | 10 | 10 | 10 |
| Polymerization Results | | | | |
| Run Time (hours) | 6½ | 4 1/5 | 5⅓ | 1¾ |
| Total Polymer produced (grams) | 1,007 | 987 | 1,692 | 477 |
| Polymer yield on catalyst (grams/gram) | 4,800 | 7,200 | 7,100 | 5,600 |

RUN B

| Polymerization Conditions | |
|---|---|
| Temperature (°F.) | 194 |
| Pressure (p.s.i.g.) | 300 |
| Reactor gas composition (mol percent) | |
| Hydrogen | 35 |
| Ethylene | 64 |
| Ethane | 0.36 |
| Isopentane | 1 |
| Catalyst | |
| Feeder concentration (milligrams/milliliter) | 250 |
| Feed rate (milligrams/hour) | 58 |
| Promoter | |
| $AlEt_3$, feeder concentration (milligrams/liter) | 250 |
| $AlEt_3$, feed rate (milligrams/hour) | 580 |
| Weight ratio ($AlEt_3$/catalyst) | 10 |
| Polymerization Results | |
| Run time (hours) | 8 |
| Total polymer produced (grams) | 2,680 |
| Polymer yield on catalyst (grams/gram) | 5,800 |

What is claimed is:

1. A polymerization catalyst for producing polyethylene or polyethylene containing up to about ten (10)

mol percent of another alpha-olefin made by a process which consists essentially of:

a. reacting at between about 25°C and 200°C a first material which is magnesium trichloroacetate with a second material which is a Periodic Group IVB or VB compound selected from the group consisting of titanium and vanadium tetrabromides, tetrachlorides, alkoxytribromides, and alkoxytrichlorides using more than about 5 weights of said second material for each weight of Periodic Group IVB or VB compound, calculated as the metal, on the solid part of the product of step (a);

b. separating said solid part of the product of step (a) which is a supported Periodic Group IV or VB compound; and c. combining said supported Periodic Group IV or VB compound with an organoaluminum compound which is a trialkylaluminum, a dialkylaluminum hydride, a dialkylaluminum halide or a combination thereof in a ratio of at least 2 millimols of said organoaluminum compound per gram of said supported Periodic Group IV or VB compound.

2. The polymerization catalyst of claim 1 wherein said organoaluminum compound is a trialkylaluminum.

3. The polymerization catalyst of claim 2 wherein said second material is titanium tetrachloride or titanium alkoxytrichloride.

4. The polymerization catalyst of claim 2 wherein said first material is magnesium trichloroacetate containing some magnesium carbonate.

5. A polymerization catalyst for producing polyethylene or polyethylene containing up to about ten (10) mol percent of another alpha-olefin made by a process which consists essentially of:

a. reacting at between about 25°C and 200°C a first material, which is the reaction product of magnesium trichloroacetate and aluminum chloride, said reaction product being made by heating said magnesium trichloroacetate and said aluminum chloride together in a mole ratio of about 50:1 to about 1:5 at about 25°C to about 200°C in a substantially non-reactive liquid medium, with a second material which is a Period Group IVB or VB compound selected from the group consisting of titanium and vanadium tetrabromides, tetrachlorides, alkoxytribromides, and alkoxytrichlorides, using more than about 5 weights of said second material for each weight of Periodic Group IVB or VB compound, calculated as the metal, on the solid part of the product of step (a);

b. separating said solid part of the product of step (a) which is a supported Periodic Group IV or VB compound; and c. combining said supported Periodic Group IV or VB compound with an organoaluminum compound which is trialkylaluminum, dialkylaluminum hydride, a dialkylaluminum halide or a combination thereof in a ratio of at least 2 millimols of said organoaluminum compound per gram of said supported Periodic Group IV or VB compound.

6. The polymerization catalyst of claim 5 wherein said organoaluminum compound is a trialkylaluminum.

7. The polymerization catalyst of claim 6 wherein said second material is titanium tetrachloride or titanium alkoxytrichloride.

* * * * *